United States Patent
Becher et al.

(10) Patent No.: US 11,552,794 B2
(45) Date of Patent: Jan. 10, 2023

(54) DETERMINISTIC RANDOM BLINDING

(71) Applicant: SAP SE, Walldorf (DE)

(72) Inventors: Kilian Becher, Dresden (DE); Julius Albert Gregor Lagodzinski, Berlin (DE); Christian Hellwig, Rott (DE); Axel Schroepfer, Borthen (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/108,764

(22) Filed: Dec. 1, 2020

(65) Prior Publication Data
US 2022/0173900 A1    Jun. 2, 2022

(51) Int. Cl.
*H04L 9/08* (2006.01)
*H04L 9/06* (2006.01)
*H04L 9/00* (2022.01)
*G06F 7/58* (2006.01)

(52) U.S. Cl.
CPC ............ *H04L 9/0869* (2013.01); *G06F 7/582* (2013.01); *H04L 9/008* (2013.01); *H04L 9/0643* (2013.01)

(58) Field of Classification Search
CPC ..... H04L 9/0869; H04L 9/008; H04L 9/0643; G06F 7/582
See application file for complete search history.

(56) References Cited

U.S. PATENT DOCUMENTS

| | | | | |
|---|---|---|---|---|
| 9,754,114 B2* | 9/2017 | Singler | ............... | G06F 21/6254 |
| 2005/0188216 A1* | 8/2005 | Crispin | ................. | H04L 9/0637 |
| | | | | 713/190 |
| 2013/0234894 A1* | 9/2013 | Oka | ....................... | G01S 5/0252 |
| | | | | 342/464 |
| 2013/0237278 A1* | 9/2013 | Oka | ...................... | H04W 48/18 |
| | | | | 455/524 |
| 2013/0238681 A1* | 9/2013 | Oka | .......................... | G06F 7/58 |
| | | | | 708/250 |
| 2017/0104745 A1* | 4/2017 | Camenisch | ............. | H04L 9/085 |
| 2019/0379538 A1* | 12/2019 | Oh | ....................... | G06F 16/1824 |

FOREIGN PATENT DOCUMENTS

CN         112100627 A  * 12/2020
WO    WO-2017097344 A1 *  6/2017   ........... G06F 21/602

OTHER PUBLICATIONS

McEvoy, Robert et al., "Fortuna: Cryptographically Secure Pseudo-Random Number Generation in Software and Hardware", Conference Paper, Jul. 2006 6pgs.

Beaver, Donald et al., "The Round Complexity of Secure Protocols", Association for Computing Machinery (AMC), 1990 (pp. 503-513, 11 total pages).

\* cited by examiner

*Primary Examiner* — Mohammed Waliullah
(74) *Attorney, Agent, or Firm* — Buckley, Maschoff & Talwalkar LLC (57) ABSTRACT

Systems and methods include determination of a first value to be blinded, determination of a first key value, generation of a first composite value based on the first value and the first key value, performance of a hash operation on the first composite value to generate a first hash value, seeding of a pseudorandom generator with the first hash value to generate a first pseudorandom value, truncation of the first hash value based on the first pseudorandom value to generate a first truncated value, and generation of a blinded value associated with the first value based on a blinding function comprising the first value and the first truncated value.

20 Claims, 7 Drawing Sheets

DETERMINISTIC RANDOM BLINDING

BACKGROUND

Enterprises expend significant resources to ensure the security of electronic data. Current trends of using untrusted third-parties (e.g., cloud-based services) for data storage and/or processing present new scenarios requiring efficient systems to provide data security.

Encryption is often used to secure electronic data. In one example, a data owner may encrypt data using an encryption key and provide the encrypted data to a third-party for storage. If the data owner wishes to use the data, the data owner retrieves the encrypted data from the third-party, decrypts the data using a decryption key which corresponds to the public key and is known only to the data owner, and proceeds to use the decrypted data.

Generally, probabilistic encryption algorithm $E(\cdot)$ takes as input a plaintext $m \in \mathcal{M}$ and an encryption key and outputs the ciphertext $c \in \mathcal{C}$. If encryption algorithm $E(\cdot)$ is homomorphic, an operation $\circ$ applied to ciphertexts $E(m_1)$ and $E(m_2)$ yields $E(m)$, where m is the result of a corresponding homomorphic operation * applied to the plaintexts $m_1$ and $m_2$ (i.e., $m=m_1*m_2$). The homomorphic operations are typically addition and multiplication, as depicted in the following, where decryption algorithm D takes as input a ciphertext $c \in \mathcal{C}$ and a decryption key and outputs the plaintext m: $D(E(m_1) \oplus E(m_2))=m_1+m_2$; $D(E(m_1) \odot E(m_2))=m_1 \cdot m_2$.

Homomorphic encryption therefore allows a data owner to outsource processing of secret data to an untrusted third party without revealing the secret data to the third party. For example, a data owner may encrypt secret plaintexts $m_1$ and $m_2$ to generate ciphertexts $E(m_1)$ and $E(m_2)$ and transmit ciphertexts $E(m_1)$ and $E(m_2)$ to a third party. The third party applies homomorphic operations to $E(m_1)$ and $E(m_2)$ to yield $E(m)$ and returns $E(m)$ to the data owner. The data owner then decrypts $E(m)$ to access desired processing result m.

Partially homomorphic encryption schemes typically enable either additive or multiplicative operations on the underlying plaintexts, while fully homomorphic encryption schemes support both addition and multiplication. Such schemes are therefore unable to provide privacy-preserved outsourced processing in the case of functions which include unsupported operations. Even in the case of supported functions, the use of homomorphic encryption schemes may require substantial computational overhead.

Blinding is used in secure computation protocols to protect secret values during plaintext processing. Such processing is not limited to homomorphic operations. Additive or multiplicative blinding uses randomness to protect confidential data. In an example of additive blinding, a secret random value r is added to a secret value x to be protected, resulting in blinded value y (i.e., $y=x+r$). Similarly, in multiplicative blinding, the secret value x to be protected is multiplied by a secret random value r to generate blinded value y, i.e., $y=x \cdot r$. Various combinations of additive blinding and multiplicative blinding may also be employed, e.g., $y=x \cdot r_1+r_2$. These additions or multiplications can be performed on a plaintext secret value x, or on an encrypted secret value x via homomorphic encryption to generate an encrypted blinded value y.

Data blinding as described above can present security risks. For example, a task may require processing of a secret value x several times. At each iteration, a new blinded value y is generated based on the secret value x, a fixed blinding equation, and a new secret random value r. Given enough iterations and some knowledge of the randomness distribution of r (e.g., the expected value), a malicious party may apply statistical methods to remove r and learn non-trivial information about the secret value x. Such repeated processing of the same secret data is fundamental to a variety of anticipated scenarios such as, but not limited to, blockchain-based supply-chain verification and outsourced privacy-preserving computations in the cloud, e.g., privacy-preserving machine learning.

An efficient blinding algorithm which addresses the foregoing deficiencies is desired.

DETAILED DESCRIPTION

The following description is provided to enable any person in the art to make and use the described embodiments. Various modifications, however, will be readily-apparent to those in the art.

Embodiments may provide an efficient method for deterministically but also randomly constructing a value r for blinding a secret value x. That is, the same random blinding value r (or values $r_i$) is/are always used for blinding the same secret value x. Since the blinding equation is typically fixed, the same blinded value y is generated for the same secret value x each time the secret value x is subjected to blinding.

Such deterministic but random blinding provides the same security guarantees as traditional additive and multiplicative blinding. The random length of r ensures that it properly hides the length of the secret value x being blinded. Also, since blinded value y is always the same for a given secret value x, repeated processing of the same x reveals no additional information about x. Therefore, when used in scenarios with reoccurring similar computations, the deterministic nature renders ineffective any statistical analyses of the underlying secret values hidden by blinded values.

Some embodiments may be implemented quite efficiently, both in terms of memory and processing resources. For example, embodiments may utilize pseudorandom generators and cryptographic hash functions, which may be efficiently implemented using hardware acceleration. Memory resources may be conserved by utilizing a single symmetric key $K_i$ to compute values $r_i$ for all secret values x.

Figure 1:
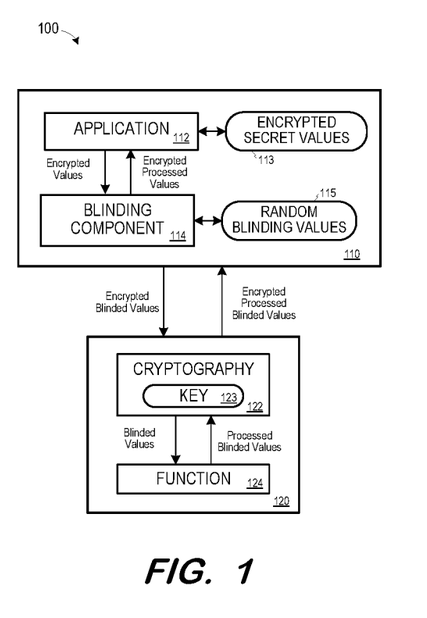
FIG. 1 is a block diagram of an architecture providing privacy-preserved outsourced processing according to some embodiments.

FIG. 1 is a block diagram of system 100 according to some embodiments. System 100 is presented to facilitate description of one implementation and usage scenario of data blinding according to some embodiments. Embodiments are not to be deemed limited thereto.

The illustrated components of system 100 may be implemented using any suitable combination of computing hardware and/or software that is or becomes known. In some embodiments, two or more components of system 100 are implemented by a single computing device. One or more components of system 100 may be implemented as a cloud service (e.g., Software-as-a-Service, Platform-as-a-Service).

Secure computation service 110 executes application 112 and stores encrypted secret values 113. Secret values 113 may include secret values $E(x_1)$, $E(x_2)$ encrypted by homomorphic encryption function $E(\cdot)$ based on an encryption key. It will be assumed that service 110 does not have access to the corresponding decryption key and therefore cannot decrypt values $E(x_1)$, $E(x_2)$. In a case that application 112 requires calculation of $$y = \frac{x_1}{x_2},$$

traditional homomorphic computation of the encrypted values cannot be employed due to the division operation. However, the quotient can be computed in plaintext by any entity having the corresponding decryption key. Multiplicative blinding may facilitate this computation by client 120 while preventing client 120 from learning $x_1$, $x_2$, and y.

For example, application 112 may initially provide encrypted values $E(x_1)$, $E(x_2)$ to blinding component 114 of service 110. Blinding component 114 acquires two corresponding random blinding values $r_1$, $r_2$ from storage 115. Random blinding values $r_1$, $r_2$ may be pre-generated as described below or generated on-the-fly. Blinding component 114 then homomorphically computes two encrypted blinded values $E(x_1 \cdot r_1)$, $E(x_2 \cdot r_2)$, and sends these encrypted blinded values to client 120.

Cryptography component 122 of client 120 decrypts $E(x_1 \cdot r_1)$, $E(x_2 \cdot r_2)$ using a corresponding decryption key 123, producing respective blinded values $(x_1 \cdot r_1)$, $(x_2 \cdot r_2)$. Function 124 then executes to compute processed blinded value $$y' = \frac{x_1 \cdot r_1}{x_2 \cdot r_2}$$

in plaintext, encrypts y', and sends the encrypted processed blinded value E(y') to service 110. Service 110 then homomorphically computes $$E(y) = E\left(\frac{x_1}{x_2}\right) = E(y') \odot E\left(\frac{r_2}{r_1}\right) = E\left(\frac{x_1 \cdot r_1}{x_2 \cdot r_2} \cdot \frac{r_2}{r_1}\right).$$

Similarly, a client-aided model can be used to compute non-polynomial activation functions in privacy-preserving machine learning (ML). In such an example, service 110 is an ML service storing secret data points $x_i$ in encrypted form in store 113. ML service 110 does not possess the corresponding decryption key and therefore cannot decrypt the stored $E(x_i)$. Since ML inference involves the computation of non-polynomial activation functions, such as sigmoid, on the $E(x_i)$, service 110 outsources the computation of this non-polynomial function to client 120 which has the corresponding decryption key and can perform the computation in plaintext.

Service 110 may use blinding in order to prevent client 120 from learning the $x_i$ or the result y. For example, before sending the $E(x_i)$ to client 120, blinding component 112 of service 110 homomorphically blinds the encrypted data points $E(x_i)$. The blinding function depends on the non-polynomial function.

Cryptography component 122 of client 120 decrypts the encrypted blinded data points $E(x_i)$ and function 124 performs the non-polynomial computation on the resulting blinded plaintext. Component 122 then encrypts the processed blinded value y', and returns the encrypted processed blinded value E(y') to service 110. Blinding component 115 homomorphically removes the blinding to obtain the encrypted result E(y) of the non-polynomial function. As alluded to above, deterministic random blinding values $r_i$ can improve security by rendering statistical analyses of the blinded secrets ineffective.

Figure 2:
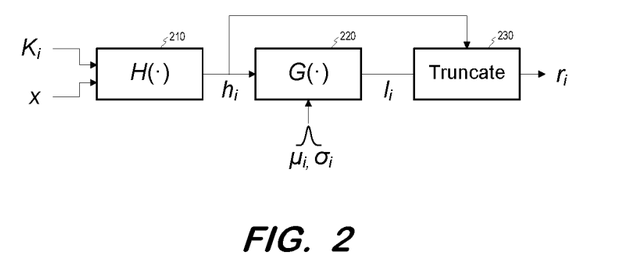
FIG. 2 is a block diagram illustrating data blinding according to some embodiments.

FIG. 2 is a block diagram illustrating data blinding according to some embodiments. Any number or type of executable software elements, hardware elements and data structures may be used to implement the components of FIG. 2.

Generally, some embodiments operate to generate a random blinding value $r_i$ for blinding a secret value x based on the secret value x and on a secret key $K_i$. The value r may then be used to determine a blinded value y based on a blinding function (e.g., y=x+r, y=x·r). In a case that the blinding equation requires more than one random blinding value $r_i$ (e.g., $y=x \cdot r_1 + r_2$), each value $r_i$ may be determined based on the same secret value x and on an $r_i$-specific secret key $K_i$.

As illustrated in FIG. 2, and for each required $r_i$, some embodiments operate to compute hash $h_i$ based on a secret value x and a secret key $K_i$. A pseudorandom value $l_i$ is generated based on the hash $h_i$. Next, $r_i$ is produced by truncating hash $h_i$ based on value $l_i$.

Hash function 210 converts a long input string of arbitrary length into a smaller string of fixed length. As shown, the long input string is based on secret value x and secret key $K_i$. In some embodiments, the long input string is the concatenation $(K_i \| x)$ of secret value x and secret key $K_i$, such that hash $h_i = H(K_i \| x)$. Other combinations of secret value x and secret key $K_i$, e.g., XOR operation, are possible.

In some embodiments, $h_1$ can be extended by combining multiple hashes to obtain longer hashes as follows:

$$h_{1_1} = H(K \| x)$$

$$h_{1_n} = h_{1_{n-1}} \| H(h_{1_{n-1}}),$$

for $$n = \left\lceil \frac{\mu_i + z \cdot \sigma_i}{l_H} \right\rceil$$

where z is the standard score and $l_H$ is the output length of the hash function.

As is known in the art, function 210 is relatively easy to compute but it is computationally infeasible to determine the input string from the output string. Hash function 210 may be cryptographic in that it is computationally infeasible to find two hashes H(x)=H(x') such that x≠x'. This cryptographic property also guarantees that it is computationally infeasible to compute x given only H(x). Hash function 210 may be implemented by any suitable cryptographic hash function (e.g., SHA-256) that is or becomes known.

Hash function 210 may be modeled as a random oracle. As such, hash function 210 is modeled to always map a given input string to a same deterministic but truly random output.

Pseudorandom generator (PRG) 220 generates a long pseudorandom number $l_i$ (i.e., "length") based on hash $h_i$. That is, $h_i$ is a "seed" for operation of PRG 220. Operation of PRG 220 may be further influenced by input normal distribution parameters (e.g., mean $\mu_i$ and variance $\sigma_i$), which dictate the distribution of the output of PRG 220.

PRG 220 may comprise a cryptographically secure PRG. A cryptographically secure PRG is defined herein as a deterministic polynomial-time algorithm G that turns short truly random (input) strings of length $L_I$, called seeds, into long pseudorandom (output) strings of length $L_O > L_I$. This property can be formalised for binary strings as follows:

$$G: \{0,1\}^{L_I} \to \{0,1\}^{L_O}$$

The resulting string of length $L_O$ is intended to be computationally indistinguishable from any truly random string of length $L_O$. That is, there is a negligible chance that one could determine which of the resulting string or any truly random string of length $L_O$ was sampled from a truly random distribution or output by PRG 220. Regarding negligibility, let $f$ be a function from the natural numbers to the non-negative real numbers. The function $f$ is negligible if for every positive polynomial p there is an $m \in \mathbb{N}$ such that the following applies for all integers $n > m$:

$$f(n) < \frac{1}{p(n)}$$

In addition to providing computational indistinguishability, the internal state of a cryptographically secure PRG does not reveal anything about previously-output random values.

Truncation component 230 takes the random number $l_i$ computed by PRG 220 and truncates $h_i$ to the determined length $l_i$ to generate $r_i$. Due to operation of hash function 210, each bit of $h_i$ is pseudorandom and uniformly distributed (i.e., each bit value has equal chance of being 0 or 1). Accordingly, each bit of $r_i$ is also pseudorandom and uniformly distributed. Moreover, since $l_i$ is pseudorandom and normally distributed, the length of $r_i$ is also random and normally distributed.

Figure 3:
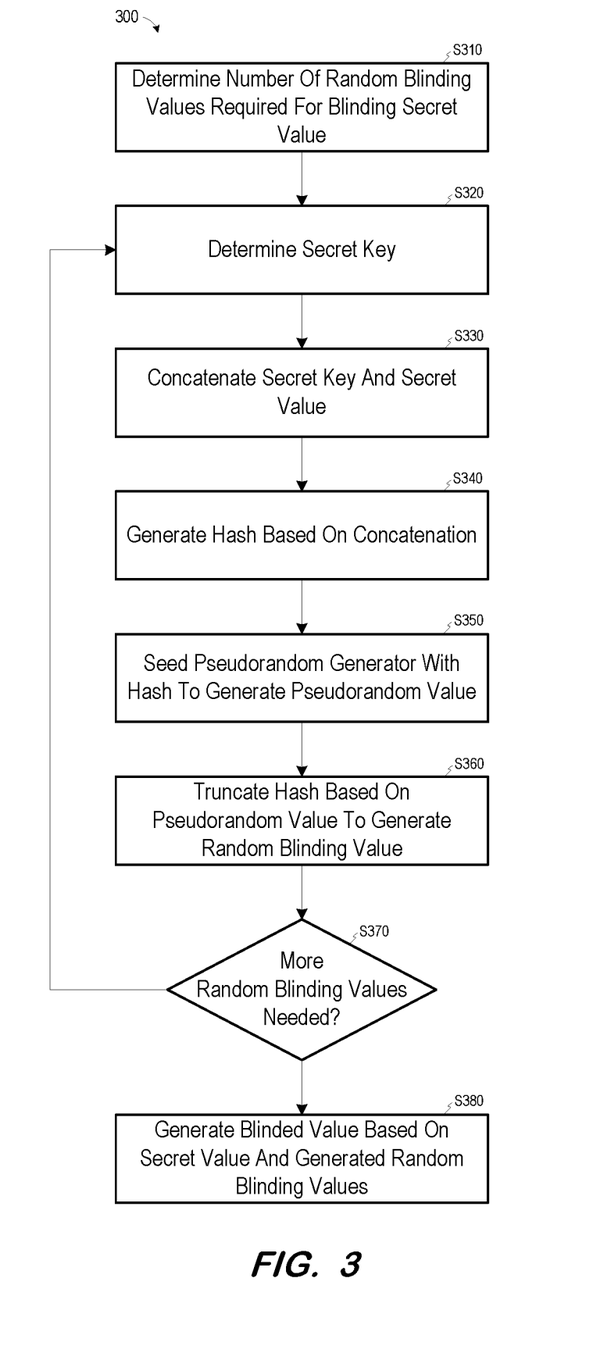
FIG. 3 is a flow diagram of a process to generate a blinded value based on a secret value according to some embodiments.

FIG. 3 comprises a flow diagram of process 300 according to some embodiments. Process 300 will be described with respect to the elements of FIG. 2, but embodiments are not limited thereto.

Process 300 and all other processes mentioned herein may be embodied in computer-executable program code read from one or more of non-transitory computer-readable media, such as a hard disk drive, a volatile or non-volatile random access memory, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Prior to process 300, it is assumed that an instruction is received to generate a blinded value y to blind a secret value x. The secret value x may be provided as plaintext, in encrypted form (i.e., E(x) for encryption function E(·) of a homomorphic cryptosystem), or in any suitable format. Depending on the respective use case and blinding function, process 300 then constructs deterministic random values $r_i$ that can be used for blinding the secret value x, e.g., additively or multiplicatively. In case x is provided in encrypted form, the blinding function is computed in the encrypted domain and the blinded value is made available in encrypted form, i.e., E(y).

Initially, at S310, a number of random blinding values required for blinding a secret value is determined. The number of random blinding values $r_i$ is determined based a blinding function to be employed. The blinding function may be configurable and/or application-selectable. For example, application 122 may provide a secret value and a selected blinding function to blinding component 124. The present example will assume a blinding function of $y = x \cdot r_1 + r_2$, and therefore the number of required random blinding values determined at S310 is 2. Embodiments are not limited thereto.

A secret key is determined at S320. The secret key may comprise long uniformly chosen secret key $K_i$ as described above. $K_i$ may be fixed for each $r_i$ regardless of the secret value x. That is, in the case of a blinding function requiring random values $r_1$ and $r_2$, a fixed secret key $K_1$ is used to compute random value $r_1$ for all secret values x, and a fixed secret key $K_2$ is used to compute random value $r_2$ for all secret values x. Accordingly, a system (e.g., application platform 110) is required to store only one secret key $K_i$ for each $r_i$.

The determined secret key (e.g., $K_1$) and the secret value x are concatenated at S330. Embodiments are not limited to concatenation. Rather, S330 may comprise any combination of the secret key $K_1$ and the secret value x which is repeatable and unique. In other words, combination of the same secret key $K_i$ and a secret value x at S330 should always produce the same result, which differs from the result produced at S330 by combination of the same secret key $K_i$ and any other secret value x.

A hash is generated at S340 based on the concatenated output of S330. Given a cryptographic hash function H(·), secret key $K_1$, and a secret value x, hash $h_1$ may be computed at S340 as follows:

$$h_1 = H(K_1 \| x)$$

where $(K_1 \| x)$ is the concatenated output of S330. It is irrelevant whether x is a plaintext value, a ciphertext, or any private value that is unique for this particular blinding computation. If H(·) is modeled as a random oracle and $K_1$ is known only to the executor of process 300, hash $h_1$ can be assumed to be distributed uniformly at random and difficult for outsiders to guess.

If $h_1$ is not reasonably longer than $\mu_1$, i.e., if the output length of the hash function is too short for the desired length of the random blinding $r_1$, $h_1$ can be extended by combining multiple hashes as follows:

$$h_{1_1} = H(K \| x)$$

$$h_{1_n} = h_{1_{n-1}} \| H(h_{1_{n-1}})$$

for $$n = \left\lceil \frac{\mu_i + z \cdot \sigma_i}{l_H} \right\rceil$$

where z is the standard score and $l_H$ is the output length of the hash function.

A pseudorandom generator is seeded with hash $h_1$ at S350. The pseudorandom generator generates a pseudorandom value $l_1$ based on the hash $h_1$. According to some embodiments, the pseudorandom generator $G(\cdot)$ is also provided with parameters of a normal distribution such that its output values $l_i$ are normally distributed in accordance with the parameters. For example, the pseudorandom generator may be provided with $\mu_1$ and $\sigma_1$ of a normal distribution as well as the hash $h_1$. Mathematically, $$l_1 = G(\mu_1, \sigma_1; h_1)$$

According to other embodiments, different probability distributions that concentrate strongly enough around a given expected value may be used.

Since $h_1$ was generated uniformly at random and is known only to the blinding component, $l_1$ is pseudorandom. Furthermore, even if a malicious party has a vague idea of x, x cannot be brute-forced without knowledge of $K_1$ due to the collision resistance of $H(\cdot)$ and the negligible chance of guessing $K_1$ correctly.

Hash $h_1$ is truncated at S360 based on $l_1$ to generate random blinding value $r_1$. In other words, $r_1$ comprises the first $l_1$ bits of $h_1$, given that the length of $h_1$ is reasonably larger than $\mu_1$. The result $r_1$ is a random value having a length that is normally distributed (assuming the psuedorandom generator employs a normal distribution) and bits that are uniformly distributed.

All inputs of $H(\cdot)$ at S340 are fixed for a given x, so $h_1$ is computed deterministically. Moreover, for the fixed $\mu_1$ and $\sigma_1$, generator $G(\cdot)$ outputs a deterministic $l_1$. Consequently, $r_1$ is deterministic for a given x.

At S370, it is determined whether more random blinding values are needed for the blinding algorithm. In the present example, the required number is 2 and only $r_1$ has been computed. Accordingly, flow returns to S320 to determine a secret key $K_2$ for a second random value $r_2$. As described above, a same secret key $K_2$ may be used to determine all $r_2$'s regardless of the secret value x.

The secret key and secret value are concatenated at S330, such as $K_2 \| x$, and hash $h_2$ is generated at S340 as $h_2 = H(K_2 \| x)$, using the same hash function $H(\cdot)$ as used to generate hash $h_1$. Previously-described pseudorandom generator $G(\cdot)$ is then seeded with hash $h_2$ at S350 and generates a pseudorandom value $l_2$ based on the hash $h_2$ and on parameters $\mu_2$ and $\sigma_2$ of a normal distribution. Similar to the above, $$l_2 = G(\mu_2, \sigma_2; h_2).$$

$\mu_2$ and $\sigma_2$ may equal either or both of $\mu_1$ and $\sigma_1$, respectively, or may be specific to $r_2$. Hash $h_2$ is truncated at S370 based on the random value $l_2$ to generate random value $r_2$.

Flow proceeds to S380 from S370 once it is determined that no more random blinding values are needed. At S380, a blinded value y is generated based on the secret value x and on the values generated during execution of process 300. According to the present example, S380 may comprise calculation of $y = x \cdot r_1 + r_2$ using the given secret value x and the generated random values $r_1$, $r_2$.

According to some embodiments, process 300 may therefore deterministically and randomly blind x with $0 < r_2 \ll r_1$ such that the result $y = x \cdot r_1 + r_2$ reveals nothing about x except for its sign. y is generated deterministically for any x using only two fixed secret keys $K_1$, $K_2$ and fixed $\mu_1$, $\mu_2$, $\sigma_1$, $\sigma_2$. Repeated application of process 300 to a same x yields the same random y, which renders statistical attacks aiming to extract x ineffective.

The secret keys $K_1$, $K_2$ as well as the parameters $\mu_1$, $\mu_2$, $\sigma_1$, $\sigma_2$ can be reused for blinding other x's with random but deterministic $r_1$, $r_2$. This reuse may result in constant storage costs and memory-efficient implementations, even for arbitrarily large amounts of secret values x to be blinded. Moreover, the hashes can be computed efficiently using hardware acceleration.

An example of generating a blinded value based on a secret value according to some embodiments now follows. For purposes of example, it will be assumed that the secret value x=1337 and the blinding equation is $y = x \cdot r_1 + r_2$. Accordingly, it is determined at S310 that two random blinding values are required to blind x based on the blinding equation.

S320 through S360 may therefore be executed to determine random blinding value $r_1$ for secret value x. It is assumed that the following secret key $K_1$ is determined at S320: 123456789123456789123456789123456789123456 789123456789123456789123456789 123456789123456789123456789123456789. Secret key $K_1$ is concatenated with secret value x to generate the following value at S330: 12345678912345678912 34567891234567891234567891234567891 23456789123456789123456789123456789123456 7891234567891337.

A hash is generated at S340 based on the concatenated value. In the present example, the decimal representation of resulting hash $h_1$ is 12180023913834089122458098505971099554012277833363161391154606098333199137571442359598137208659175890895574888124802718911833787201576180192531161602854904.

A pseudorandom generator is seeded with hash $h_1$ and instructed to generate output value $l_1$ based on Gaussian distribution parameters $\mu_1 = 150$ and $\sigma_1 = 15$ at S350. It will be assumed that the generated output value $l_1$ is 137. Accordingly, hash $h_1$ is truncated to its first 137 bits at S360 to generate random value $r_1$: 127358070247395477276019506894727261196280.

The foregoing process repeats to generate random value $r_2$. As described above, generation of random value $r_2$ may be based on a respective secret key $K_2$ and respective distribution parameters $\mu_2$ and $\sigma_2$.

Assuming that $K_2$=987654321987654321987654321 9876543219876543219876543219876543219876543 21 987654321987654321987654321987654321, concatenation of secret key $K_2$ with secret value x at S330 results in: 98765432198765432198765432198765432198765432 1987 65432198765432198765432 1 9876543219876543219876543219876543211337.

A hash $h_2$ is generated at S340 based on the concatenated value. In the present example, the decimal representation of resulting hash $h_2$ is 10394917632023567660693763045310713707469774117631509819079887589733921758833041599674232983755441059719417581153026901067676843155178094341816595681780599.

By then seeding the pseudorandom generator with hash $h_2$ and Gaussian distribution parameters $\mu_2 = 50$ and $\sigma_2 = 5$, output value $l_2$ is generated at S350. It will be assumed that the generated output value $l_2$ is 45. Hash $h_2$ is truncated to its first 45 bits at S360 to generate random value $r_2$=27340434973559.

Based on deterministically-determined $r_1$ and $r_2$, and blinding equation $y = x \cdot r_1 + r_2$, deterministically blinded value y corresponding to secret value x is determined at S380 as 1337*12735807024739547727601950689472726119 6280+27340434973559=17027773992076775311803808 0718277688654399919.

Figure 4:
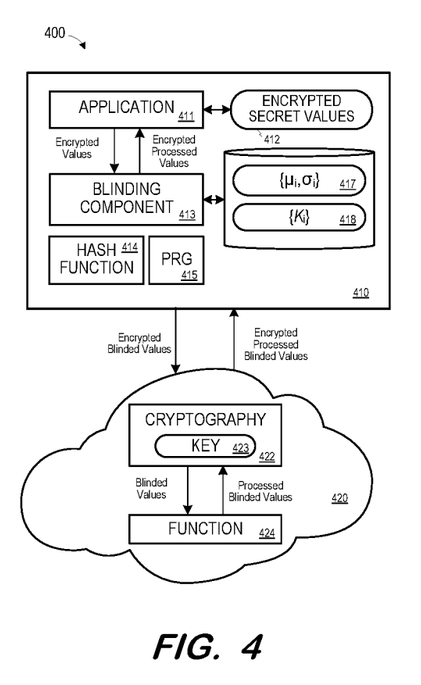
FIG. 4 is a block diagram of an architecture providing privacy-preserved outsourced processing according to some embodiments.

FIG. 4 is a block diagram of system 400 according to some embodiments. System 400 implements blinding in order to achieve secure computation of a function which is incompatible with homomorphic encryption. The computation may be performed by a cloud-based client.

Service 410 stores encrypted secret values 412. Application 411 provides one or more encrypted values 412 to blinding component to blind the encrypted values prior to transmission to cloud-based client 420 for processing as described with respect to FIG. 1. Such blinding may proceed in any manner described herein. In this regard, service 410 further provides, for use by blinding component 413, processor-executable program code of hash function 414 and of PRG 415, which may make use of hardware acceleration, as well as distribution parameters 417 and secret keys 418. As described above, generation of different random blinding values $r_i$ may utilize same or different distribution parameters $\mu_i$ and $\sigma_i$. In contrast, a different secret key $K_i$ is used to generate each $r_i$ required by a given blinding equation.

Figure 5:
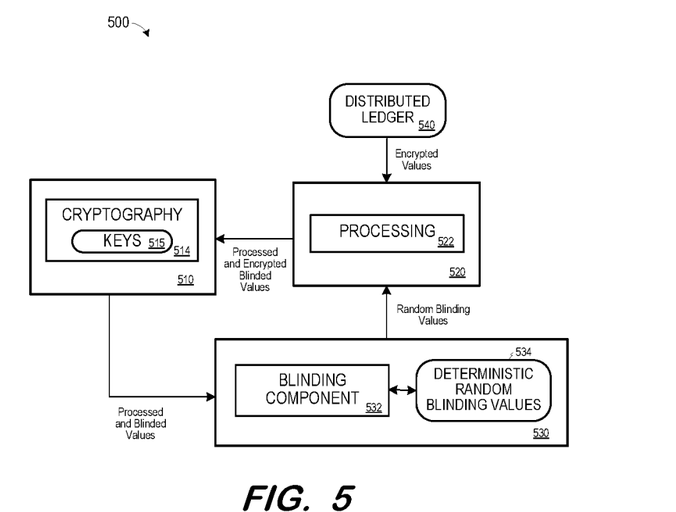
FIG. 5 is a block diagram of an architecture providing privacy-preserved outsourced decryption by a first party and privacy-preserved outsourced processing by a second party according to some embodiments.

FIG. 5 is a block diagram of system 500 implementing privacy-preserved outsourced decryption by a first party and privacy-preserved outsourced processing by a second party according to some embodiments. For example, system 500 may comprise a distributed-ledger-based supply-chain traceability system where confidential supply chain details, e.g., amounts, prices, etc., are published via a distributed ledger in a privacy-preserving form, e.g., homomorphically encrypted.

A verification service 520 allows requestor 530 to verify claims about their products, e.g., the percentage of ethically sourced cobalt in a smartphone. The following protocol uses decryption service 510 to ensure that verification service 520 learns neither the supply chain details nor the verification result and that requestor 530 only learns the verification result. Moreover, despite having the secret decryption key, decryption service 510 also does not learn the verification result or the supply chain details.

For example, requestor 530 queries verification service 520 to perform a verification and provides a random blinding value r, which may be encrypted. Processing component 522 of verification service 520 retrieves required encrypted values from distributed ledger 540 and performs a privacy-preserving computation thereon, e.g., via homomorphic encryption, to generate encrypted result E(y). Processing component 522 further additively blinds the encrypted result E(y) with r, i.e., E(y')=E(y+r) and sends the processed and encrypted blinded value E(y') to decryption service 510. Decryption service 510 decrypts E(y') and sends the blinded plaintext y' to requestor 530. Blinding component 532 of requestor 530 then removes the known blinding value to acquire the computation result y. If r is computed deterministically, e.g., by using evaluation parameters as x in $h_i = H(K||x)$, its deterministic nature renders ineffective any statistical analyses by the decryption service 510.

Figure 6:
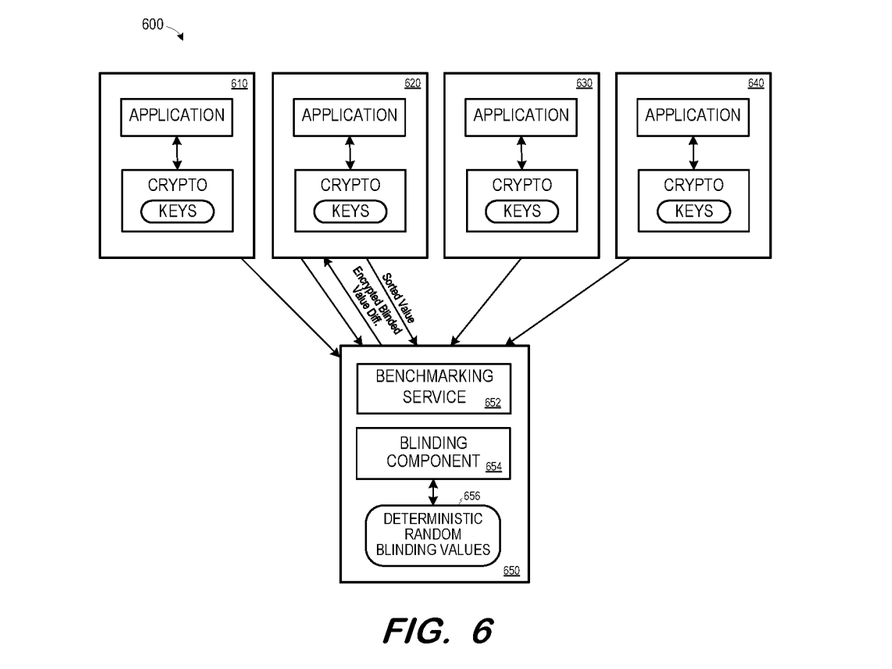
FIG. 6 is a block diagram of an architecture providing privacy-preserved cross-entity comparisons according to some embodiments.

FIG. 6 is a block diagram of system 600 implementing blinding to reduce intermediate results to a desired property prior to decryption in order to prevent revealing of information to the decryptor. Such a techniques may be employed in conjunction with any of the previous examples.

System 600 may, for example, illustrate a cross-company benchmarking system that allows companies to compare KPIs in a privacy-preserving form, e.g, via homomorphic encryption. Such benchmarking might employ sorting to provide rank-based statistical measures. Since sorting involves comparison, which cannot be performed easily for encrypted data, the following protocol uses a client-aided model to compare private data in encrypted form without revealing private data to the client.

In the present example, each of systems 610 through 640 holds secret values and common encryption keys. Benchmarking service 650 receives encrypted values from each of systems 610 through 640 and homomorphically subtracts two encrypted values $E(x_1)$, $E(x_2)$ to be compared (e.g., to determine the respective order of $x_1$, $x_2$ in a sorted list. Blinding component 654 homomorphically blinds the encrypted difference $E(y')=E((x_1-x_2) \cdot r_1 + r_2)$ using deterministic random blinding values 656 such that $0 < r_2 \ll r_1$ and sends the encrypted blinded difference to one of systems 610 through 640 (i.e., system 620 of FIG. 6).

System 620 decrypts E(y') and returns an indication of the sorting of $x_1$, $x_2$ based on the value of y' (e.g., "Value 1≥Value 2" if y'≥0). Benchmarking service 650 receives the comparison result and can continue operating in this manner to sort any number of secret values. Blinding according to this example reduces the difference between $x_1$ and $x_2$ to a sign, i.e., whether it is positive or negative, which is sufficient for comparison. Advantageously, this reduction leaks neither the actual difference nor the values that are being compared.

Figure 7:
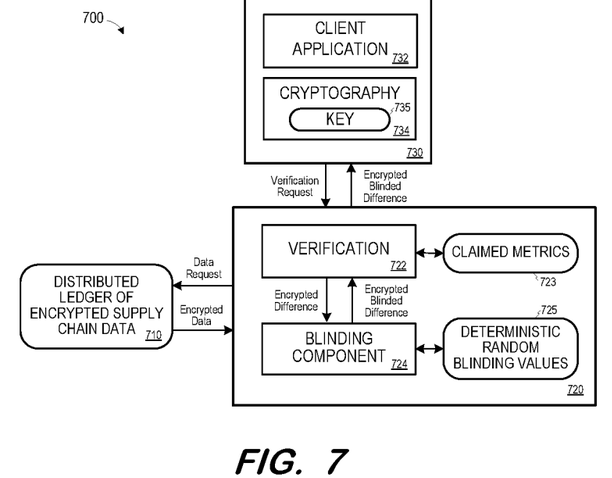
FIG. 7 is a block diagram of an architecture providing privacy-preserved data verification according to some embodiments.

FIG. 7 illustrates distributed-ledger-based supply chain traceability system 700. Distributed ledger 710 may publish confidential supply chain details, e.g., amounts, prices, etc., in a privacy-preserving e.g., homomorphically-encrypted form. Verification service 720 allows client 730 to verify claims about products, e.g., the percentage of ethically-sourced cobalt in a smartphone.

In response to a verification request received from client 730 via client application 732 (e.g., a Web browser), verification component 722 of verification service 720 receives encrypted supply chain data from distributed ledger 710 and homomorphically computes the encrypted percentage of ethically-sourced cobalt E(p) in a subject item based thereon. Verification component 720 homomorphically subtracts from p the claimed ratio p̂ of ethically-sourced cobalt stored in claimed metrics 723 (i.e., E (y)=E(p−p̂)). Blinding component 724 then additively and multiplicatively blinds this encrypted difference, i.e., $E(y')=E(p-\hat{p}) \cdot r_1 + r_2$ such that $0 < r_2 \ll r_1$ are deterministic random blinding values.

Client 730 receives the encrypted blinded difference E(y') from verification service 720. Given access to corresponding decryption key 735, cryptography component 734 decrypts the encrypted blinded difference E(y') and determines whether the claim is correct or not depending on the sign of y'. Consequently, client 730 only learns whether the claim is true or not but learns nothing else, such as the actual ratio or confidential supply chain data. Verification service 720 does not learn the supply chain data or the verification result.

Figure 8:
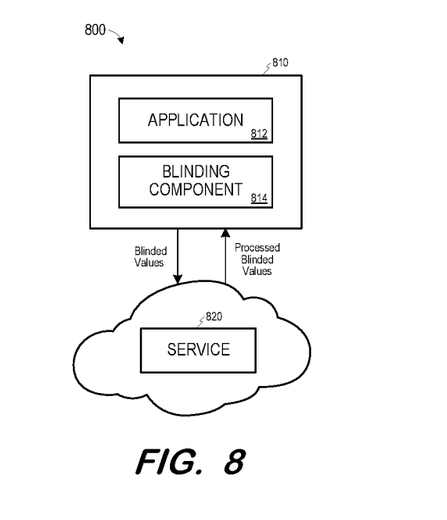
FIG. 8 is a block diagram of an architecture providing privacy-preserved data processing according to some embodiments.

FIG. 8 is a block diagram of system 800 according to some embodiments. Blinding component 814 of client 810 may receive a secret value from application 812 and generate a corresponding blinded value as described herein. The blinded value may be transmitted to cloud-based storage service 820 for storage. Since a thusly-blinded value does not reveal the underlying secret value, cloud-based storage service 820 may be untrusted.

Figure 9:
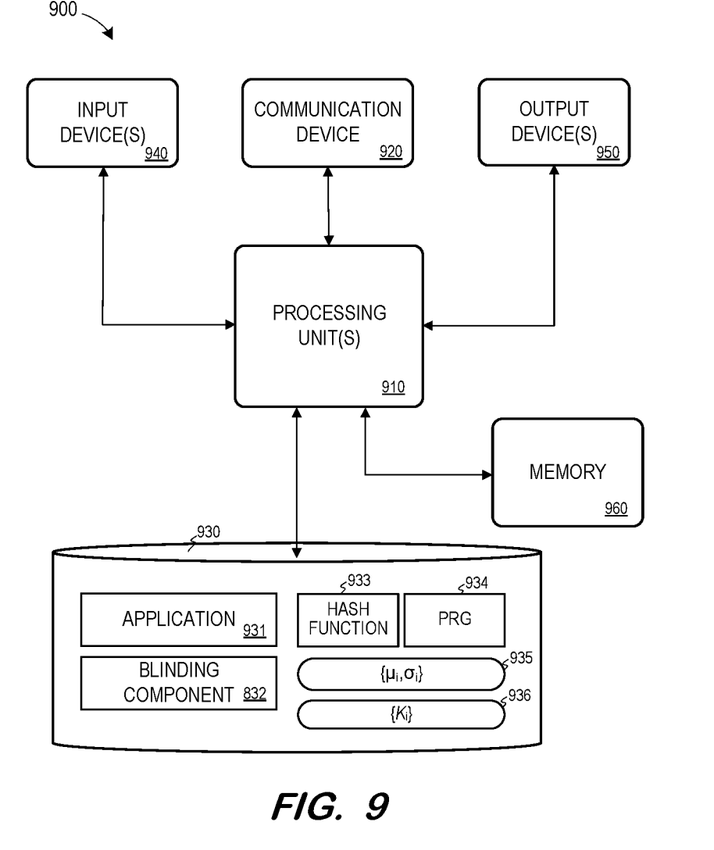
FIG. 9 is a block diagram of a computing system providing an application platform according to some embodiments.

FIG. 9 is a block diagram of computing system 900 providing an application platform according to some embodiments. Computing system 900 may comprise one or more general-purpose computing apparatuses and may execute program code to perform any of the functions described herein. Computing system 900 may comprise an implementation of service 410 in some embodiments. Computing system 900 may include other unshown elements according to some embodiments.

Computing system 900 includes processing unit(s) 910 operatively coupled to communication device 920, data storage device 930, one or more input devices 940, one or more output devices 950 and memory 960. Communication device 920 may facilitate communication with external devices, such as an external network, the cloud, or a data storage device. Input device(s) 940 may comprise, for example, a keyboard, a keypad, a mouse or other pointing device, a microphone, knob or a switch, an infra-red (IR) port, a docking station, and/or a touch screen. Input device(s) 940 may be used, for example, to enter information into apparatus 900. Output device(s) 950 may comprise, for example, a display (e.g., a display screen) a speaker, and/or a printer.

Data storage device 930 may comprise any appropriate persistent storage device, including combinations of magnetic storage devices (e.g., magnetic tape, hard disk drives and flash memory), optical storage devices, Read Only Memory (ROM) devices, and RAM devices, while memory 960 may comprise a RAM device.

Application 931, blinding component 932, hash function 933 and PRG 934 may each comprise program code executed by processing unit(s) 910 to cause system 900 to perform any one or more of the processes attributed thereto herein, for example, using distribution parameters 935 and secret keys 936. Embodiments are not limited to execution of these processes by a single computing device and may use hardware-acceleration. Data storage device 930 may also store data and other program code for providing additional functionality and/or which are necessary for operation of computing system 900, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation some embodiments may include a processor to execute program code such that the computing device operates as described herein.

Embodiments described herein are solely for the purpose of illustration. Those in the art will recognize other embodiments may be practiced with modifications and alterations to that described above.

What is claimed is:

1. A system comprising:
a memory storing processor-executable program code; and
a processing unit to execute the processor-executable program code to cause the system to:
determine a first value;
determine a first key value;
generate a first composite value based on the first value and the first key value;
perform a hash operation on the first composite value to generate a first hash value;
seed a pseudorandom generator with the first hash value to generate a first pseudorandom value;
truncate the first hash value to generate a first truncated value, where a number of truncation bits of the first truncated value is determined based on the first pseudorandom value; and
generate a blinded value associated with the first value based on a blinding function comprising the first value and the first truncated value.

2. The system according to claim 1, wherein seeding of the pseudorandom generator with the first hash value to generate the first pseudorandom value comprises providing a first mean and a first variance of a normal distribution to the pseudorandom generator.

3. The system according to claim 1, wherein generation of the first composite value comprises concatenation of the first value and the first key value.

4. The system according to claim 1, wherein performance of the hash operation comprises performance of the hash operation to generate an intermediate hash value based on the first composite value, performance of the hash operation on the intermediate hash value to generate a second intermediate hash value, and performance of the hash operation based on the intermediate hash value and the second intermediate hash value.

5. The system according to claim 1, the processing unit to execute the processor-executable program code to cause the system to:
determine a second key value;
generate a second composite value based on the first value and the second key value;
perform the hash operation on the second composite value to generate a second hash value;
seed the pseudorandom generator with the second hash value to generate a second pseudorandom value; and
truncate the second hash value to generate a second truncated value, where a number of truncation bits of the second truncated value is determined based on the second pseudorandom value,
wherein the blinding function comprises the first value, the first truncated value and the second truncated value.

6. The system according to claim 5, the processing unit to execute the processor-executable program code to cause the system to:
determine a second value;
generate a third composite value based on the second value and the first key value;
generate a fourth composite value based on the second value and the second key value;
perform the hash operation on the third composite value to generate a third hash value;
perform the hash operation on the fourth composite value to generate a fourth hash value;
seed the pseudorandom generator with the third hash value to generate a third pseudorandom value;
seed the pseudorandom generator with the fourth hash value to generate a fourth pseudorandom value;
truncate the third hash value to generate a third truncated value, where a number of truncation bits of the third truncated value is determined based on the third pseudorandom value;
truncate the fourth hash value to generate a fourth truncated value, where a number of truncation bits of the fourth truncated value is determined based on the fourth pseudorandom value; and generate a second blinded value associated with the second value based on a blinding function comprising the second value, the third truncated value, and the fourth truncated value.

7. The system according to claim 1, wherein the first value is an encrypted value and the blinded value is an encrypted blinded value, the processing unit to execute the processor-executable program code to cause the system to:
transmit the encrypted blinded value to a second system to decrypt the encrypted blinded value to generate a blinded value, to perform a function on the blinded value to generate a processed blinded value, to encrypt the processed blinded value to generate an encrypted processed blinded value, and to return the encrypted processed blinded value to the system; and
unblind the encrypted processed blinded value to generate an encrypted processed value.

8. A computer-implemented method comprising:
receiving an instruction to blind a first value; and
in response to the instruction:
determining a first key value;
generating a first composite value based on the first value and the first key value;
performing a hash operation on the first composite value to generate a first hash value;
seeding a pseudorandom generator with the first hash value to generate a first pseudorandom value;
truncating the first hash value to generate a first truncated value, where a number of truncation bits of the first truncated value is determined based on the first pseudorandom value; and
generating a blinded value associated with the first value based on a blinding function comprising the first value and the first truncated value.

9. The method according to claim 8, wherein seeding of the pseudorandom generator with the first hash value to generate the first pseudorandom value comprises providing a first mean and a first variance of a normal distribution to the pseudorandom generator.

10. The method according to claim 8, wherein generating the first composite value comprises concatenating the first value and the first key value.

11. The method according to claim 8, wherein performing the hash operation comprises performing the hash operation to generate an intermediate hash value based on the first composite value, performing the hash operation on the intermediate hash value to generate a second intermediate hash value, and performing the hash operation based on the intermediate hash value and the second intermediate hash value.

12. The method according to claim 8, further comprising:
determining a second key value;
generating a second composite value based on the first value and the second key value;
performing the hash operation on the second composite value to generate a second hash value;
seeding the pseudorandom generator with the second hash value to generate a second pseudorandom value; and
truncating the second hash value to generate a second truncated value, where a number of truncation bits of the second truncated value is determined based on the second pseudorandom value,
wherein the blinding function comprises the first value, the first truncated value and the second truncated value.

13. The method according to claim 12, further comprising:
receiving a second instruction to blind a second value; and
in response to the second instruction:
determining the first key value and the second key value;
generating a third composite value based on the second value and the first key value;
generating a fourth composite value based on the second value and the second key value;
performing the hash operation on the third composite value to generate a third hash value;
performing the hash operation on the fourth composite value to generate a fourth hash value;
seeding the pseudorandom generator with the third hash value to generate a third pseudorandom value;
seeding the pseudorandom generator with the fourth hash value to generate a fourth pseudorandom value;
truncating the third hash value to generate a third truncated value, where a number of truncation bits of the third truncated value is determined based on the third pseudorandom value;
truncating the fourth hash value to generate a fourth truncated value, where a number of truncation bits of the fourth truncated value is determined based on the fourth pseudorandom value; and
generating a second blinded value associated with the second value based on a blinding function comprising the second value, the third truncated value, and the fourth truncated value.

14. The method according to claim 8, wherein the first value is an encrypted value and the blinded value is an encrypted blinded value, the method further comprising:
transmitting the encrypted blinded value to a remote system;
at the remote system:
decrypting the encrypted blinded value to generate a blinded value;
performing a function on the blinded value to generate a processed blinded value;
encrypting the processed blinded value to generate an encrypted processed blinded value; and
returning the encrypted processed blinded value to the system; and
unblinding the encrypted processed blinded value to generate an encrypted processed value.

15. A computer-readable medium storing program code executable by a processor to cause a computing system to:
receive an instruction to blind a first value; and
in response to the instruction:
determine a first key value;
generate a first composite value based on the first value and the first key value;
perform a hash operation on the first composite value to generate a first hash value;
seed a pseudorandom generator with the first hash value to generate a first pseudorandom value;
truncate the first hash value to generate a first truncated value, where a number of truncation bits of the first truncated value is determined based on the first pseudorandom value; and
generate a blinded value associated with the first value based on a blinding function comprising the first value and the first truncated value.

16. The medium according to claim 15, wherein seeding of the pseudorandom generator with the first hash value to generate the first pseudorandom value comprises providing a first mean and a first variance of a normal distribution to the pseudorandom generator.

17. The medium according to claim 15, wherein generation of the first composite value comprises concatenating the first value and the first key value.

18. The medium according to claim 15, wherein performance of the hash operation comprises performance of the hash operation to generate an intermediate hash value based on the first composite value, performing the hash operation on the intermediate hash value to generate a second intermediate hash value, and performing the hash operation based on the intermediate hash value and the second intermediate hash value.

19. The medium according to claim 15, the program code executable by a processor to cause a computing system to:
determine a second key value;
generate a second composite value based on the first value and the second key value;
perform the hash operation on the second composite value to generate a second hash value;
seed the pseudorandom generator with the second hash value to generate a second pseudorandom value; and
truncate the second hash value to generate a second truncated value, where a number of truncation bits of the second truncated value is determined based on the second pseudorandom value,
wherein the blinding function comprises the first value, the first truncated value and the second truncated value.

20. The medium according to claim 19, the program code executable by a processor to cause a computing system to:
receive a second instruction to blind a second value; and
in response to the second instruction:
determine the first key value and the second key value;
generate a third composite value based on the second value and the first key value;
generate a fourth composite value based on the second value and the second key value;
perform the hash operation on the third composite value to generate a third hash value;
perform the hash operation on the fourth composite value to generate a fourth hash value;
seed the pseudorandom generator with the third hash value to generate a third pseudorandom value;
seed the pseudorandom generator with the fourth hash value to generate a fourth pseudorandom value;
truncate the third hash value to generate a third truncated value, where a number of truncation bits of the third truncated value is determined based on the third pseudorandom value;
truncate the fourth hash value to generate a fourth truncated value, where a number truncation of bits of the fourth truncated value is determined based on the fourth pseudorandom value; and
generate a second blinded value associated with the second value based on a blinding function comprising the second value, the third truncated value, and the fourth truncated value.

* * * * *